Oct. 9, 1934.  O. H. BLACKWOOD  1,975,824
BRAKE METER AND ACCELEROMETER
Filed May 11, 1933
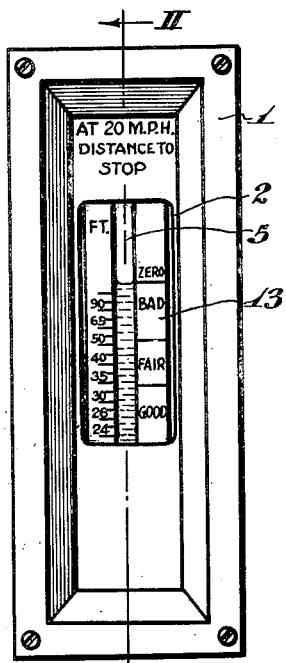
Fig.1
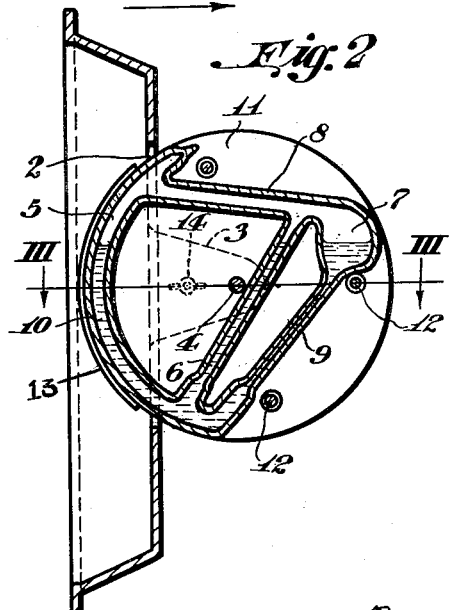
Fig.2
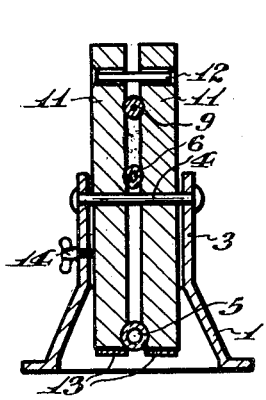
Fig.3
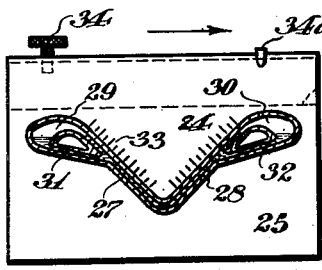
Fig.5
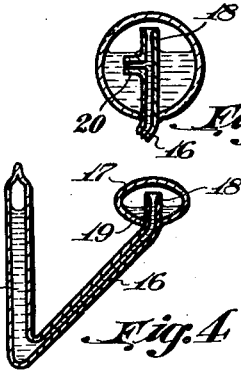
Fig.4
Fig.4a
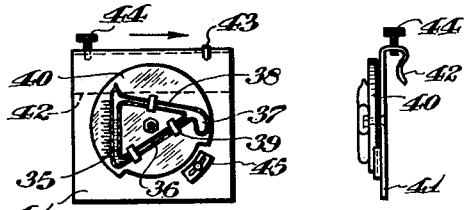
Fig.6  Fig.7
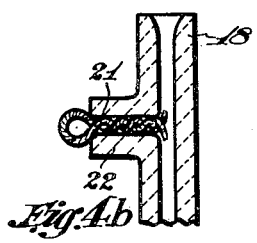
Fig.4b
INVENTOR.
Oswald H. Blackwood.
BY Richard E. Marine
ATTORNEY.

Patented Oct. 9, 1934

1,975,824

UNITED STATES PATENT OFFICE 1,975,824

BRAKE-METER AND ACCELEROMETER

Oswald H. Blackwood, Pittsburgh, Pa.

Application May 11, 1933, Serial No. 670,495

20 Claims. (Cl. 264—1)

This invention relates broadly to means for simply and accurately indicating braking and accelerating forces as well as changes in velocity of moving bodies, such as automobiles, airplanes, railway trains and the recoil accelerations of cannons thereby enabling the speed of projectiles to be determined. It may also be used to measure the tilt or inclination of a non-accelerated body.

As an important special application, the invention may be embodied in an instrument to measure the efficiency of the brakes on automobiles or as a skidometer to test the non-skid characteristics of road surfaces of different compositions, that is, to determine the coefficient of friction between the tires and the roadway.

On a level roadway, if the instrument is so adjusted that its scale reading is zero for zero acceleration, it will indicate either accelerating force or horizontal acceleration. On an incline, if set as above, the instrument measures the total retarding force, that is, the sum of force to overcome the component of gravity parallel to the line of motion and the decelerating force. Thus it measures the total braking force on either hill or level. However, if on a hill of constant inclination the instrument is adjusted to read zero when at rest, it will read the horizontal component of the impressed acceleration.

In so far as I am aware, my invention is the first to provide a continuous scale indication of the accelerating force on a moving body or the inclination of a non-accelerated body wherein the final maximum indication is maintained for any desired period to permit it to be observed by the driver at his leisure, thus obviating the difficulty in prior instruments of the continuous scale type that they must be read substantially simultaneously with the conditions indicated, which is frequently impossible, and always unsafe, while driving.

In a simple embodiment of my invention, I provide an upright tube containing a visible liquid and communicating at its bottom with a second or riser tube forward thereof, the liquid normally rising to the same height in both tubes.

On level roadway, upon braking the car (negative acceleration), the liquid will be lowered in the first tube proportionately to the deceleration, and will correspondingly rise in the second tube. By preventing the return of the excess liquid passing up the second tube, as by causing it to pass a gravity potential barrier, an accurate measure of the rate of deceleration may be obtained at leisure. This may be indicated by a scale located adjacent either to the first tube or to the second tube or by a scale indicating the quantity of liquid passing by the barrier, and suitable means are preferably provided to adjust the instrument to a true zero setting.

The gravity potential barrier of my invention may conveniently take the form of a reservoir communicating at its top with the top of the second or riser tube. Any suitable expedient may be employed to reset the device after an indication, for instance, it may be rotated manually about an axis so as to cause return of the excess liquid from the reservoir to the tube. Or a capillary duct may lead from a point below the surface of the liquid in the reservoir to a point in one of the tubes. Several forms of my invention embodying these features are shown. By selecting capillary of the proper bore and length, the excess liquid may be caused to return to the system as slowly as desired. For example, a capillary duct 1/3 mm. in diameter and 2 cm. long may be employed. This arrangement of independent riser and return duct permits the flow of the excess liquid from the riser tube when braking the car to take place much more rapidly than if a restriction were placed in the riser tube to retard the return of the liquid. For then, the retardation would be the same in both directions. This is disadvantageous, since a much longer time is needed to make the reading than is desirable for complete operation of the device.

As a further feature of my invention, the first tube is preferably made relatively large. For example, it may have a bore 7 mm. in diameter, while the second tube is preferably of less bore diameter, say 1 mm. This has the important function of damping out oscillations in the system. It has the further important advantage that after the deceleration is over and constant or zero speed obtains, the liquid settling from the second tube into the first, to restore equilibrium, will not materially raise the height of the liquid in the first tube, and therefore, the final reading will not be materially different from one taken simultaneously with the deceleration, thus obviating liability to error in making readings.

The instrument may either be evacuated or may operate under atmospheric pressure, in the latter case an equalizing duct being preferably provided between the tops of the first and riser tubes and reservoir in order that the system may be hermetically sealed.

The instrument may advantageously be permanently mounted on the instrument board of the car, but my invention may take the further form of a portable instrument to demonstrate either the "pick up" or the "braking" efficiency of various cars or the non-skidding characteristics of roadways. In this case the instrument may be mounted to be suspended from a window on one side of the car for testing positive acceleration or "pick up" and in reverse position on an opposite window for testing "braking" efficiency. Means for adjusting the instrument to the same level are provided; or alternatively, I may provide the instrument with a duplex system for measuring positive acceleration and retardation from the same position on the car.

The scale of the instrument may be calibrated to give any suitable indications, for instance, (a) feet/sec.²; (b) acceleration/(acceleration of gravity); (c) feet to stop from given initial velocity; (d) brake force/weight of car. If desired, removable scales may be provided for indications of different character.

The instrument may be readily calibrated by tilting it through an angle $\theta$ and noting the scale reading. In general, for an acceleration $a$, on a horizontal roadway, $\tan \theta = a/g$, where $g$ is the acceleration of gravity.

It can be readily shown that if the scale is located on the larger of the two riser tubes and the reading is adjusted to zero when the car is standing on a level, the braking indications are substantially independent of the grade—all tests on hill or level giving the true braking reading.

The liquid employed should desirably be of high density, of low surface tension, of low viscosity, of high visibility, of low explosiveness—carbon tetrachloride, chloroform or mercury being suitable examples.

An important feature of my invention is that it employs no mechanically moving parts in giving its indications.

In the accompanying drawing, forming a part of this specification and showing for purposes of exemplification, preferred forms and manners in which the invention may be embodied and practiced but without limiting the claimed invention to such instance or instances:

Figure 1 is a front view of the instrument adapted to be set in an instrument board of a car, or the like;

Figure 2 is a vertical section on the line II—II of Figure 1.

Figure 3 is a horizontal section on the line III—III of Figure 2.

Figure 4 is a modified form of the tubular system of Figure 2.

Figures 4a and 4b are modified forms of the capillary duct of Figure 4.

Figure 5 is a form of portable instrument adapted to indicate either positive or negative acceleration.

Figure 6 is a simplified form of my system well adapted to a portable instrument, as shown, and Figure 7 is an end view of the same.

Referring to the drawing, Figs. 1, 2 and 3 show an instrument frame or casing 1 adapted to be screwed to an instrument board, the latter being cut out to permit insertion of the indicating system proper. Preferably integral with the casing and on opposite sides of an opening 2 through the front thereof are two ears 3 between which said system is rotatably mounted on a shaft 4.

The indicating system proper comprises a conveniently arc-shaped upright tube 5, connected at its bottom to the inclined riser tube 6, preferably of smaller dimensions than the tube 5, which in turn is connected at its top to the upper end of a reservoir 7, both being connected by the equalizer tube 8 to the top of the tube 5. If the system is evacuated, the tube 8 may be omitted. A capillary leak tube 9 leads from the reservoir 7 to the bottom of the riser tube 6. The tubular system is filled with a visible liquid 10 to a point near the top of the riser tube 6 and a fairly deep body of liquid is maintained in the reservoir to prevent entrapment of air in the capillary tube 9, which would cause trouble.

The tubular system is conveniently mounted between two circular discs 11, preferably of a phenol condensate product, the discs being held together in any suitable manner, as by rivets 12, the assembly being then mounted on the shaft 4. An appropriate scale 13 is placed on the front edges of the discs 11 adjacent the tube 5. The assembly is adjustable to zero position by turning it about the shaft 4, being retained in such position by a set screw 14 in ear 3 which engages one of the discs 11.

In the operation of the instrument of Fig. 2, when the brakes are applied, the level of the liquid in tube 5 will be depressed and the riser tube 6 will overflow into the reservoir 7; since this tube is relatively small, oscillations of the liquid will be damped out. The deceleration should continue until the liquid has had time to attain equilibrium. The apparatus is, therefore, designed to make this time as short as is consistent with non-oscillation by choice of a capillary of suitable length and bore, the drawing showing a convenient way of varying the length without varying the overall dimensions of the system. When the period of deceleration has passed, the liquid in the tubes 5 and 6 will settle to a new level which, because the tube 6 is much smaller than the tube 5, will be substantially that of the liquid in the tube 5 during maximum deceleration. The indication may be read on the scale at the driver's leisure. However, in the form of instrument shown in Figure 2, the time within which the reading may be made is limited by the action of the capillary leak tube 9, designed to automatically return the liquid gradually from the reservoir to "set" condition, after any predetermined time necessary for a reading, say in several minutes.

It is not essential that the apparatus be reset to "zero" before further test, for if a second braking occurs, liquid will again be thrown into the reservoir and a second reading may be made.

In Figure 4 is shown a modification of the tubular and reservoir system of Figure 2 in which the upright tube 15 is straight rather than arc-shaped, the riser pipe 16 has its upper end 18 extending above the bottom of the reservoir 17 and surrounded thereby, and a capillary "leak" opening 19 extends through the tube 16 just above the bottom of the reservoir. The system is evacuated. The operation is similar to that of Figure 2 save that the leak 19 feeds directly back into the riser tube rather than to a point at its base.

The problem of securing an accurate control of leakage is difficult. It has been solved in Figure 4 by the provision of the small leak opening 19; in Figure 4a by the provision of a capillary tube 20 of suitable length and bore on the side of the upper end 18 of tube 16; and in Figure 4b by inserting a single wire or twisted wires 21 through the bore of a similar capillary tube 22.

In Figure 5 is shown a portable instrument comprising a plate 25 having a flange 26 adapted to fit over the top edge of a lowered car window, there being mounted on the plate an evacuated tubular system comprising two legs 27, 28; reservoirs 29, 30 and capillary return ducts 31, 32. In this instrument, a positive acceleration will cause liquid to rise in the left tube and to be depressed in the right, the scale 24 adjacent to the latter leg indicating the accelerating force. A braking force will produce the opposite effect, and its value will be indicated on the scale 33 at the left. A set screw 34 and stop 34a provide convenient means for adjusting the zero.

In Figure 6 is shown a simple and efficient form of my system comprising the upright tube 35, riser tube 36, reservoir 37 and equalizer tube 38, mounted by keepers 39 on a disc 40 rotatably mounted on a plate 41 having a flange 42 by which it may be hung over the top of a car window, a stop 43 and set screw 44 being provided for adjusting the zero setting. The plate is provided with an adjustable stop 45 to fix the limit of rotation of the disc 40 in resetting.

Since in this form of device when the brakes are applied and the fluid rushes over the gravitational potential barrier constituted by the reservoir 37, there is no automatic return for this fluid, the instrument retains its reading until manually reset by a counterclockwise rotation of the disc 40, the equalizer tube 38 serving to speed the return of the fluid to the tubes.

To measure positive accelerating forces, the instrument is reversed and hung on the opposite window of the car. Vacuum cups may be employed in lieu of the flanges to attach the instrument to the side windows or wind shield.

In all cases, the upright tube may be inclined to conform to the inclination of the instrument board.

While I have illustrated and described the best forms of my invention known to me, it will be understood that changes may be made in the apparatus disclosed without departing from the spirit of my invention, and that certain features may sometimes be used to advantage without a corresponding use of other features.

I claim as my invention:

1. In a system for measuring accelerating and decelerating forces acting on moving bodies in combination: two riser tubes in communication with each other at their bottoms, one being of substantially smaller bore than the other, to damp out oscillations, increase sensitiveness and obviate corrections for grades, the larger of said tubes being provided with a scale, said tubes being positioned with reference to each other to permit inertia to effect the transfer of liquid from one to the other, a reservoir communicating above its bottom end with the top of said second mentioned tube; a gas equalizing duct leading from the top of said reservoir and second mentioned tube to approximately the top of said first mentioned tube; a feed back duct, of smaller diameter than said second mentioned tube, leading from a point below the normal surface of the liquid in said reservoir to one of said tubes, said system being partially filled with an indicating liquid, and means for adjusting the zero position of the system.

2. In a system for measuring accelerating and decelerating forces acting on moving bodies in combination: two riser tubes in communication with each other at their bottoms, one being of substantially smaller bore than the other, to damp out oscillations, increase sensitiveness and obviate corrections for grades, said tubes being positioned with reference to each other to permit inertia to effect the transfer of liquid from one to the other; a gravitational potential barrier connected at its top to the riser tube of smaller bore to prevent return of the excess liquid passing through said smaller tube; a feed back duct, of smaller diameter than said second mentioned tube, leading from a point below the top of said barrier to one of said tubes, said system being partially filled with an indicating liquid.

3. In a system for measuring the accelerating and decelerating forces acting on moving bodies, in combination: two riser tubes in communication with each other at their bottoms, and at least partially filled with a liquid; said tubes being located with reference to each other to permit inertia to effect a transfer of liquid from one to the other; means for preventing return of the liquid overflowing from the latter tube, the quantity of liquid escaping being a measure of the accelerating or decelerating force along the line of motion and means for measuring the quantity of the escaped liquid.

4. In a system for measuring the accelerating and decelerating forces acting on moving bodies, in combination: two riser tubes in communication with each other at their bottoms, and at least partially filled with a liquid; said tubes being located with reference to each other to permit inertia to effect a transfer of liquid from one to the other; means for preventing return of the liquid overflowing from the latter tube, the quantity of liquid escaping being a measure of the accelerating or decelerating force along the line of motion, means for measuring the quantity of the escaped liquid and means for restoring said overflow liquid to the system after the measurement is determined.

5. In an instrument for the purposes described, in combination: two riser tubes in communication with each other at their bottoms, one in the rear of the other with respect to the line of travel, one being of smaller bore than the other to damp out oscillations; increase sensitiveness and obviate corrections for grades, a reservoir communicating above its bottom with the top of said tube of smaller bore; and a liquid partially filling the system.

6. In an instrument for the purposes described, in combination: two riser tubes in communication with each other at their bottoms; a reservoir communicating above its bottom with the top of one of said tubes; and a liquid partially filling the system, there being a restriction in its line of travel through said tubes to prevent oscillation.

7. In an instrument for the purposes described, in combination: two riser tubes in communication with each other at their bottoms; a reservoir communicating above its bottom with the top of one of said tubes and a liquid partially filling the system.

8. In a system for measuring accelerating and decelerating forces acting on moving bodies, in combination: a substantially upright tube; a second substantially upright tube of materially smaller bore than said first tube, said tubes being inter-connected and at least partially filled with a liquid and located with reference to each other to permit inertia to cause the liquid to fall in the larger tube and to rise in the smaller tube and means preventing return of the excess liquid rising through said smaller tube, the amount of the remaining liquid flowing back from said smaller tube being insufficient to materially disturb the resultant level of the liquid in said first tube.

9. In a system for measuring accelerating and decelerating forces acting on moving bodies, in combination: two riser tubes in communication with each other at their bases, at least partially filled with a liquid and located with reference to each other to permit inertia to cause the liquid to fall in one tube and to rise in the other tube and means preventing return of the excess liquid rising through said other tube, the amount of liquid escaping being a measure of the retarding or accelerating force and means for measuring the quantity of the escaped liquid.

10. In a system for the purposes described in combination: two riser tubes in communication at their bottoms, one being of substantially smaller bore than the other; said system being partially filled with an indicating liquid; said tubes being disposed with reference to each other to permit inertia to effect a transfer of liquid from one to the other; and a gravitational potential barrier preventing return of the excess flow of liquid through the tube of smaller bore upon operation of the system, at least during the interval required to make an observation, the amount of the remaining liquid flowing back from said smaller tube being insufficient to materially disturb the level of the liquid in the other tube.

11. In a system for the purposes described, in combination: two riser tubes in communication at their bottoms, one being of substantially smaller bore than the other; said system being partially filled with an indicating liquid; and means preventing return of the excess flow of liquid through the tube of smaller bore upon operation of the system, at least during the interval required to make an observation, the amount of the remaining liquid flowing back from said smaller tube being insufficient to materially disturb the level of the liquid in the other tube.

12. In a system for measuring accelerating and decelerating forces acting on moving bodies, in combination: two riser tubes in communication with each other at their bottoms and at least partially filled with a liquid, said tubes being located with reference to each other to permit inertia to effect a transfer of liquid from one tube to the other, one or both tubes being provided with a stationary gravity potential barrier at its top to prevent return of liquid flowing therefrom when the system is operated, and a feed back duct for said overflow liquid leading to one of said tubes to restore the overflow liquid to reset the system, said duct being of dimensions to insure sufficient time for observing the indication before the latter is substantially disturbed by the return of the liquid.

13. In a system for measuring accelerating and decelerating forces acting on moving bodies, in combination: two riser tubes in communication with each other at their bottoms and at least partially filled with a liquid, said tubes being located with reference to each other to permit inertia to effect a transfer of liquid from one tube to the other, one or both tubes being provided with a stationary gravity potential barrier at its top to prevent return of liquid flowing therefrom when the system is operated.

14. In a system for measuring accelerating and decelerating forces acting on moving bodies, in combination: two riser tubes in communication with each other at their bottoms, said tubes being at least partially filled with a liquid and located with reference to each other to permit inertia to transfer liquid from one tube to the other; a gravity potential barrier preventing return of liquid overflowing from either of said tubes, an accelerating force on the liquid causing overflow from one tube and a depression of the liquid in the other tube which will be a measure of the accelerating force; and a decelerating force causing overflow from the other tube, and a depression of the fluid in the first tube, which will be a measure of the decelerating force.

15. A portable system for measuring accelerating and decelerating forces acting on a vehicle, comprising a frame member adapted to be attached to a car side window, carrying on its free face means for indicating decelerating forces acting on the vehicle; said means comprising two riser tubes interconnected at their lower ends and one of said tubes being connected at its upper end to a reservoir over a gravity potential barrier said device being adapted to be transferred and attached in reverse position to the opposite window to indicate accelerating forces acting on the vehicle.

16. A portable system for measuring accelerating and decelerating forces acting on a vehicle, comprising a frame member adapted to be attached to a car side window, carrying on its free face means for indicating decelerating forces acting on the vehicle; said means comprising two riser tubes interconnected at their lower ends and one of said tubes being connected at its upper end to a reservoir over a gravity potential barrier said device being adapted to be transferred and attached in reverse position to the opposite window to indicate accelerating forces acting on the vehicle; said device being adjustable to zero position on either side.

17. An instrument for the purposes described, comprising an upwardly extending tube; a riser tube in communication with the bottom of said upwardly extending tube; a reservoir communicating above its bottom with the top of said riser tube; said system being partially filled with a liquid and being pivoted to turn in an arc about an axis perpendicular to the plane of said tubes to reset the liquid to zero position after operation of the device.

18. A system for measuring accelerating and decelerating forces acting on moving bodies, comprising a continuous scale; means responsive to the acceleration or deceleration of the body for indicating on said scale the accelerating or decelerating force; said means comprising two riser tubes interconnected at their lower ends and one of said tubes being connected at its upper end to a reservoir over a gravity potential barrier means for maintaining said indication to enable it to be observed after the acceleration or deceleration has ceased; and means to reset the system to its initial condition.

19. In an instrument for the purposes described, in combination: two riser tubes of different bores in communication at their lower ends, the tube of larger bore leading the tube of smaller bore in the direction of positive or negative acceleration, said tubes containing an indicating liquid, and means obstructing the return of excess flow through the smaller tube when the instrument is operated.

20. In an instrument for the purposes described, in combination: two riser tubes of different bores in communication at their lower ends, one in rear of the other in the line of travel, the tube of larger bore being provided with a scale, and means obstructing the return of excess flow through the smaller tube when the instrument is operated.

OSWALD H. BLACKWOOD.